United States Patent [19]

Kang et al.

[11] 4,243,988
[45] Jan. 6, 1981

[54] MEANS FOR IMPROVING ANGULAR RESOLUTION OF INCOHERENT PULSE RADAR SYSTEMS

[75] Inventors: Eyung W. Kang, Margate; Ruy L. Brandao, Ft. Lauderdale; Jaromir R. Bares, Lighthouse Point, all of Fla.; Delmar V. Payne, Ferndale, Mich.

[73] Assignee: The Bendix Corporation, Southfield, Mich.

[21] Appl. No.: 16,575

[22] Filed: Mar. 1, 1979

[51] Int. Cl.$^3$ .................. G01S 13/00; G01S 13/10
[52] U.S. Cl. .................. 343/5 VQ; 343/11 R; 364/724
[58] Field of Search .......... 343/5 DP, 5 VQ, 11 R; 364/724

[56] References Cited

U.S. PATENT DOCUMENTS

| | | | |
|---|---|---|---|
| 3,836,964 | 9/1974 | Evans | 343/5 VQ |
| 3,946,382 | 3/1976 | Kossiakoff et al. | 343/5 VQ |
| 4,021,616 | 5/1977 | Betts | 364/724 |
| 4,025,919 | 5/1977 | Jefferies et al. | 343/5 VQ |
| 4,053,750 | 10/1977 | Constant | 364/724 |

Primary Examiner—Stephen C. Buczinski
Attorney, Agent, or Firm—W. G. Christoforo; Bruce L. Lamb

[57] ABSTRACT

A radar field of interest is divided into cells at a common range but at different angular spacings. The second derivative of the signal intensity of a radar return signal in each range cell is obtained by subtracting the signal intensity in the cell of interest from the signal intensity in the adjacent cell to obtain the first derivative and then subtracting the first derivative thus obtained from the subsequent first derivative. The second derivative is summed with subsequent second derivatives and further summed with the original return signal. The last sum is scaled, raised to an exponential value and again summed with the original return signal. The resultant signals from each range cell are reassembled to form a field of data corresponding to the radar field of interest.

8 Claims, 16 Drawing Figures 4,243,988

MEANS FOR IMPROVING ANGULAR RESOLUTION OF INCOHERENT PULSE RADAR SYSTEMS

FIELD OF THE INVENTION

The present invention relates to means for digitally processing radar return signals and more particularly to radar return digital processing means for improving angular resolution of an incoherent pulse radar system.

BACKGROUND OF THE INVENTION

The ability of a radar system to distinguish between two closely spaced targets is termed resolution. Resolution is further broken down into range resolution and angular (azimuth or elevation) resolution. Range resolution is the ability of the radar system to distinguish between two targets on the same azimuth and closely spaced in range. Angular resolution is the ability of the radar system to distinguish between two targets at the same range and closely separated in azimuth or elevation. Angular resolution is directly related to radar antenna beamwidth. Specifically, in an incoherent pulse radar system, multiple targets separated by the radar antenna beamwidth are generally considered to be inseparable; that is, when two targets are located at the same range but X degrees apart, the radar system cannot resolve the targets if the radar antenna employed has a −3 db beamwidth of X degrees. In this case what are actually two targets will be displayed as a single target by the radar system.

The steady steep drop over the last decade in the cost per bit of solid state digital logic components, together with the fact that solid state digital logic components allow large amounts of data capacity to be compacted into an extremely small volume at a very small weight, have led to the marketing of devices wherein analog data is converted into digital format and digitally processed before being converted back into analog format for use. For example, airborne digital radar systems have a major portion of the airborne radar market. In these systems, a radar return signal in analog format is converted into a digital format. The digitized return signals are integrated scan to scan and pulse to pulse to remove noise and other anomalies from the signal before display or transmission to a remote location for use.

The art has long taught the use of a digital reiteration memory which is periodically updated with new data and which includes in memory all the data required for a single frame of a cathode ray tube display. The reiteration memory is continuously read-out at flicker-free rates, synchronously with the cathode ray tube raster scan period. A digital reiteration memory is used in some radar systems to store a complete frame of radar data to be read-out onto a cathode-ray tube as described above. In this case the radar return signals are digitized and optionally integrated before storage into the reiteration memory.

In a standard search type radar system an antenna beam is made to sweep either in azimuth or elevation from a common center through a field of interest. In a pulse radar the sweep is actually comprised of a plurality of electromagnetic pulses radiated from the antenna at closely spaced angular intervals. The return from each pulse comprises a radar return signal or line of data which describes the space through which the radar pulse travels. The radar pulse actually illuminates an angular sector of space with electromagnetic energy with the highest energy content being generally along the antenna boresight and tapering to either side of boresight. The angular sector is defined by the radar antenna beamwidth and is normally considered to be contained within the half power or −3 db beamwidth of the radar antenna. As previously mentioned, the radar returns from multiple targets at approximately the same range and lying within the −3 db beamwidth cannot usually be resolved into individual targets.

SUMMARY OF THE INVENTION

According to the present invention, the angular resolution of an incoherent pulse radar is improved by digital processing of the radar return signals. More specifically, each radar return signal is digitized so as to comprise a serial string of binary words, each word defining the intensity of the radar return signal within a given range cell. The first derivative of the signal intensity in each range cell is obtained by digitally subtracting the digital word defining the signal intensity in the range cell from the word defining the signal intensity in the same range cell but in an adjacent angular line, that is, at the same range cell but delayed by one radar transmission pulse, assuming the radar beam is being swept through the field of interest. The second derivative is obtained by subtracting the first derivative thus obtained from the first derivative obtained from the subsequent radar transmission pulse. The second derivative, digitally scaled, is summed with subsequent second derivatives obtained in the same range cell. The sum signal is summed with the original digital word, suitably delayed. The last sum signal is again scaled digitally and raised to an exponential value and again summed with the original digital signal. The resultant signals from each range cell are reassembled into lines of digital data corresponding to radar return signals and will exhibit improved angular target resolution.

The means for accomplishing the above can be constructed from standard commercially available digital components such as shift registers, summers, scalers, delay elements and gates. The digital components are redundant in that one design of logic circuit can be used for each digitally processed range cell. Thus, if a radar return signal is divided into 256 range cells, each of which is defined, as to the return signal intensity therein, by a digital word, then 256 identical digital logic circuits can be used to construct such means.

It is thus an object of this invention to provide a means for digitally processing the radar return signals from an incoherent pulse radar system to improve the angular resolution.

It is another object of this invention to provide an incoherent pulse radar system which can resolve multiple targets lying within one beamwidth of the radar antenna.

It is a further object of this invention to provide means for improving the angular resolution of an incoherent pulse radar system which can use a plurality of identical circuits for digitally processing the radar return signals.

One more object of the invention is to provide means for improving the angular resolution of an incoherent pulse radar system which is adapted for use in a digitally processed radar display system.

These and other objects of the invention will become apparent with a reading and understanding of the following description of the invention with reference to the drawings and appended claims.

DESCRIPTION OF THE PREFERRED EMBODIMENT

Figure 1:
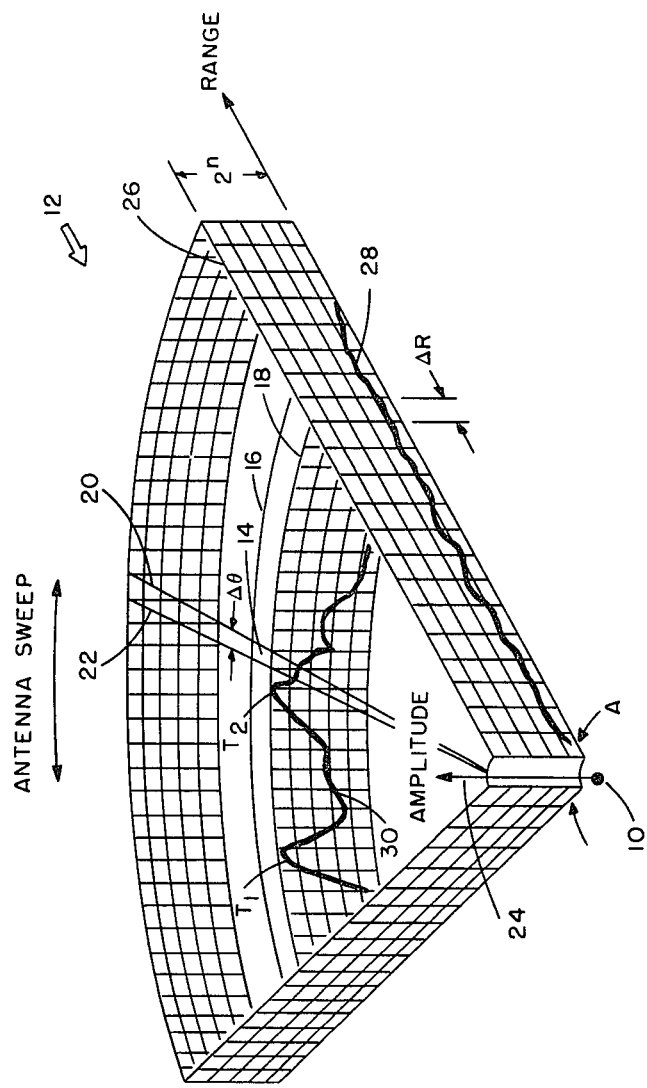
FIG. 1 is a stylized representation of a radar field of interest of a radar system whose beam sweeps through the field of interest from a point which is fixed with respect to the field of view.

Referring first to FIG. 1, a representation of a typical field of interest 12 of a radar system is seen where the antenna beam radiates from a location 10 and sweeps through the field of interest 12 which is defined by an angle A. Location 10 can be fixed or moving, as in the case of an airborne radar system. Where location 10 is moving, the field of interest moves therewith so that there is no significant relative movement between location 10 and field of interest 12. Field of interest 12 is divided into a plurality of range cells, such as range cell 14, which are defined by range lines, such as lines 16 and 18 spaced $\Delta R$ apart, and azimuth lines, such as 20 and 22 spaced $\Delta\theta$ apart. The range lines are circular arcs struck from location 10 and the azimuth lines are radials from location 10. Generally, $\Delta R$ is a constant through the whole field of interest 12 and depends on the frequency of the range clock as known to those skilled in the art. $\Delta\theta$ is generally constant but can vary within the field of interest within design limits which depend on the pulse repetition frequency and jitter of the radar system as also known to those skilled in the art.

The intensity or amplitude of radar return signals is shown in the field of interest 12 plotted against the vertical axis 24. It should be noted that the vertical axis is divided into an arbitrary number of steps $2^n$. As will be shown below, n is the number of binary digits which define the instantaneous amplitude of the radar return signal and is determined by the circuitry to be described.

Shown plotted against azimuth line 26 in analog format is a radar return signal 28. It should be understood that radar return signal 28 is the radar return from a single radar transmitted pulse directed along azimuth line 26. Shown plotted against range line 18 is a radar representation of the field of interest in the range enclosed by range lines 16 and 18. This representation is obtained by sampling the same range cell of the plurality of radar return signals similar to radar return signal 28 as the antenna beam is scanned through angle A over the field of interest 12. It can be seen that the field of interest includes at least targets $T_1$ and $T_2$ for example.

Figure 2:
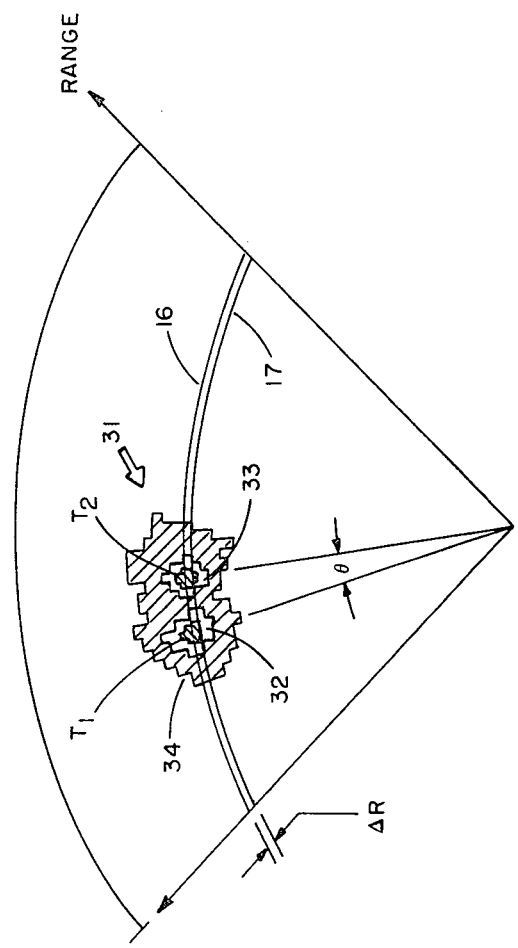
FIG. 2 shows a PPI display of two radar targets at a common range and closely spaced in azimuth but separated in azimuth more than one antenna beamwidth so that the targets are resolved on the display. The display is typical of an airborne weather radar system.

Refer now to FIG. 2 which shows in PPI format a radar display corresponding to field of interest 12 of FIG. 1. The radar display of FIG. 2 is typical of a weather radar cathode ray tube display wherein the radar return signals are digitally processed for display, as evidenced by the "blocky" appearance of the weather display 31 consisting of targets $T_1$ and $T_2$. In essence, weather display 31 consists of a plurality of tiny blocks or range cells which correspond to the range cells of FIG. 1. As known to those skilled in the art, weather display 31 depicts a storm having cells of severe weather represented by targets $T_1$ and $T_2$ each surrounded by areas of less severe weather represented by 32 and 33 which in turn are surrounded by even less severe weather represented by 34. The remainder of the display depicts clear weather. Targets, or weather cells, $T_1$ and $T_2$ are angularly separated by $\phi$ degrees. Assuming the present invention is not used in the radar system then for $T_1$ and $T_2$ to appear on the display as two distinct targets $\phi$ must be greater than the $-3$ db beamwidth of the antenna system. If $\phi$ were less than the $-3$ db beamwidth of the antenna system then $T_1$ would merge into and be indistinguishable from $T_2$. By use of the present invention the angular resolution of the radar system is increased so that $\phi$ can be less than the $-3$ db of the antenna system and still permit $T_1$ and $T_2$ to be displayed as separate and distinct targets.

Figure 3:
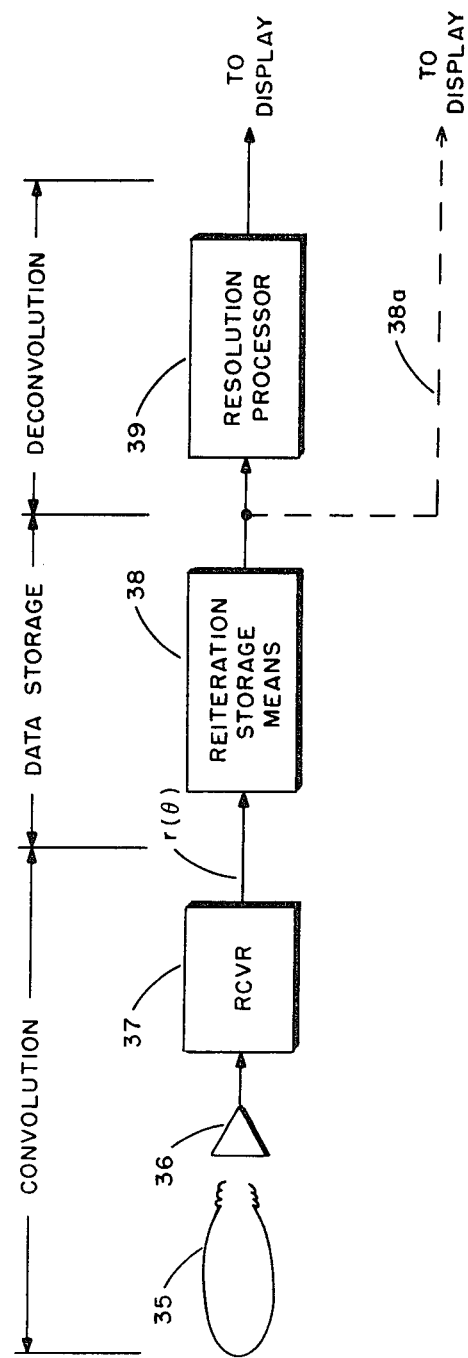
FIG. 3 is a block diagram showing the invention used in a radar system.

Referring now to FIG. 3 a radar receiver system is seen which uses the present invention. Specifically, a radar receiver 37 receives radar signal returns arriving at antenna 36 from targets illuminated by the transmitted beam 35. The detected signals corresponding to the radar return signals are applied to a reiteration storage means 38 from receiver 37. As known to those skilled in the art, reiteration storage means includes an analog-to-digital converter which reduces the analog video signals to digital format for optimal integration to reduce noise and clutter and for storage in a digital reiteration memory wherein one complete frame of radar data is retained. According to the prior art, that data stored in the reiteration memory is read-out at flickerfree rates to a suitable display such as a cathode ray tube as represented by dashed line 38a. According to the present invention, however, the data from the reiteration memory is read-out to the display through a resolution processor 39 which embodies the present invention to improve angular target resolution.

Figure 11:
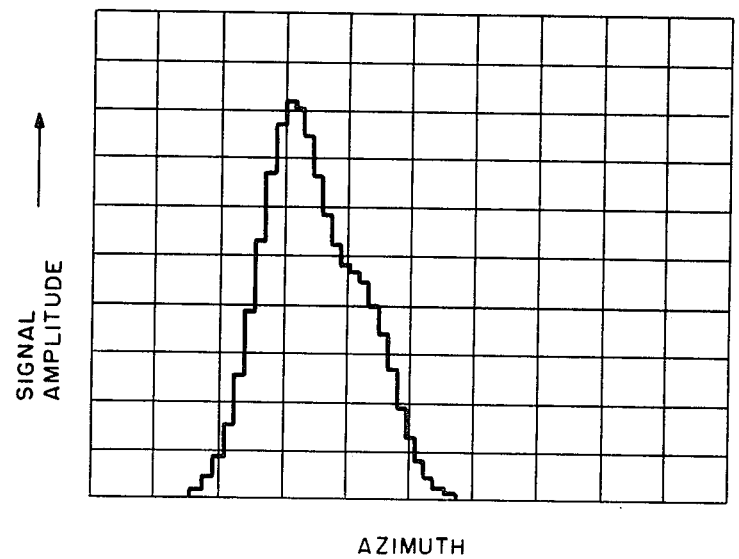

As known in the art, the analog video signals from receiver 37 are the result of the convolution of the antenna transmitted beam 35 with the various targets illuminated thereby. A convolution integral may be expressed mathematically, as known in the art, as:

$$r(\theta_i) = \int_{\theta_L}^{\theta_R} A(\theta) \, T(\theta - \theta_i) \, d\theta \quad (1)$$

where $A(\theta)$ is the antenna pattern and may be either Gaussian or Lambda and $T(\theta)$ is target amplitude in angle $\theta$. Also as known in the art, the convolved signal r(t) of a point target with an antenna pattern is the antenna pattern itself with a constant multiplier. A multiple target produces an algebraic sum of the convolutions of the individual target points as shown in FIG. 11, as will be explained below. In a strict sense, as will be clear as this description proceeds, the signal of FIG. 11 is plotted in digital format. The signal at the output of receiver 37 would have a smooth contour rather than the stepped contour of FIG. 11.

It can be shown that the targets can be separated from the convolved signal by the use of a deconvolution filter having a filter function [f(A)] which is a function of the antenna pattern A or a convolved function of g [R(A)], where [R] is the envelope matrix of the received radar signal. Under these conditions the target matrix [T] can be approximated as follows:

$$[T] = [f(A)] \cdot [R]$$

The desired deconvolution filter function is:

$$g[R(A)] = \mathrm{Exp}\{-K_o[R(\theta_t) + R''(\theta_t)]\} \quad (2)$$

where:
$K_o$ = constant
$R(\theta_t)$ is the received signal envelope
$R''(\theta_t)$ is the second derivative of the received signal envelope.

It is now merely necessary to show that resolution processor 39 is a deconvolution filter having the function g [R(A)] given above which is multipled by the envelope of the received radar signal to produce a resultant signal having improved resolution.

It should now be obvious to one skilled in the art that deconvolution of the received radar signal can be performed prior to storing the signals in the reiteration storage means. In other words, the positions in FIG. 3 of the reiteration storage means 38 and resolution means 39 can be interchanged.

Figure 4:
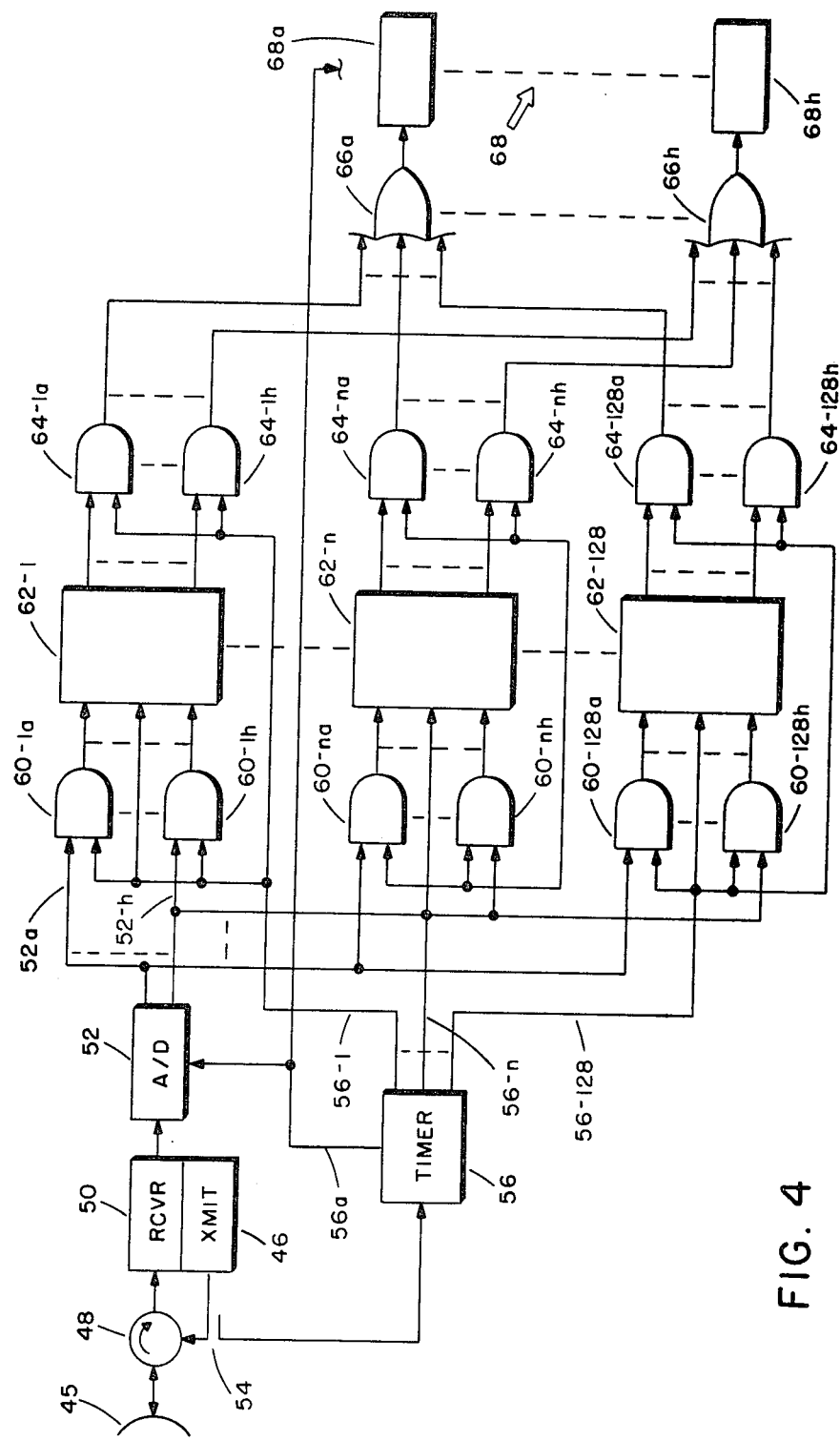
FIG. 4 is a block diagram of the logic elements comprising the present invention.

FIG. 4, reference to which should now be made, like FIG. 3 shows a radar system using the invention and is helpful in explaining the environment in which the invention is used. In this figure the resolution processor is connected to receive directly the digitized receiver output and feed a reiteration storage means as suggested immediately above. FIG. 4 shows the invention in greater detail. The figure shows an antenna 45 from which a beam is radiated to scan over the field of interest. A radar transmitter 46 periodically generates radar pulses which are communicated through circulator 48 to antenna 45 for radiation therefrom. Means for scanning the beam through the field of interest, such as means for mechanically scanning the antenna or means for electronically steering the beam are well known to those skilled in the art and thus need not be described here.

Radar return signals are picked up by antenna 45 during the interpulse period and communicated through circulator 48 to radar receiver 50 wherein they are processed. The processed radar return signals, normally at video frequencies and in analog format, are then communicated to analog to digital converter 52. It should be understood that for the purposes of this description a radar return signal is the signal received by antenna 45 in response to the transmission of a single transmitted pulse. An example of such a radar return signal is represented at 28 in FIG. 1 and comprises one azimuth (or elevation, if the radar beam is scanned in elevation) line of radar data.

The pulses from transmitter 46 are sampled by a directional coupler 54 and applied to trigger a timer 56. Timer 56, in this embodiment, comprises a time base such as a source of clock pulses which issue from timer 56 on line 56a and are applied to a buffer 68 as will be explained below. A predetermined number of clock pulses are generated in response to each pulse sampled by a directional coupler 54. In this embodiment 128 clock pulses are so generated. Timer 56 also includes a counter which responds to the clock pulses and a decoder which responds to the state of the counter so as to energize, in turn, one at a time of the lines 56-1 through 56-128. Thus, the first clock pulse generated in response to a transmitter pulse sampled by pick-off 54 causes line 56-1 to be energized, the $128^{th}$ clock pulse causes line 56-128 to be energized and the $n^{th}$ clock pulse causes line 56-n to be energized.

As known to those skilled in this art, the pulse repetition frequency of the clock pulses and the number of clock pulses generated (128) determine the range of the signal returns processed by this radar system in that each clock pulse corresponds to a particular range cell in the radar field of interest. In other words, a particular range cell in the field of interest is uniquely defined by the azimuth (or elevation) angle of the radar beam and the position of a clock pulse in the string of 128 clock pulses. For example, referring again to FIG. 1 and assuming there are (n−1) range cells between range cell 14 and location 10, range cell 14 is defined by the pointing angle of the antenna beam and the $n^{th}$ clock pulse. Thus, assuming the antenna beam pointing angle is in the direction of range cell 14, at the $n^{th}$ clock pulse a digital number related to the intensity of the signal return from range cell 14 is available at the output taps of analog to digital converter 52.

As previously mentioned, the radar return signals in analog format, such as represented at 28 of FIG. 1, are applied to analog to digital converter 52 which digitizes the signal in accordance with the signal amplitude. Analog to digital converter 52 operates in response to the clock pulses on line 56a so that at each clock pulse there is available collectively at lines 52a through 52h a digital word corresponding to the amplitude of a radar signal return from the associated range cell as previously described. Thus, at the first clock pulse from timer 56 after a pulse from transmitter 46 line 56-1 is energized, thus qualifying AND gates 60-1a through 60-1h to allow the digital word corresponding to the amplitude of the radar signal return from the first, or closest to location 10 of FIG. 1 range cell to pass therethrough and into logic circuit 62-1. At the $n^{th}$ clock pulse line 56-n is energized thus qualifying AND gates 60-1na through 60-nh to allow the digital word corresponding to the amplitude of the radar signal return from the $n^{th}$ range cell to pass therethrough into logic circuit 62-n. In like manner the digital words corresponding to the amplitude of the radar return signal at the various range cells pass into associated logic circuits. In this embodiment where each radar return is divided into 128 range cells 128 logic circuits 62-n are used. Thus, there are 128 of the logic circuits 62 so that at the 128$^{th}$ clock pulse line 56-128 is energized, thus qualifying AND gates 60-128a through 60-128h to allow the digital word corresponding to the amplitude of the radar signal return from the 128$^{th}$ range cell to pass therethrough into logic circuit 62-128. Also in this embodiment, analog to digital converter generates an 8-bit digital word which is equal to 256 levels of radar signal return amplitude. Thus lines 52a through 52h comprise 8 lines and gates 60-na through 60-nh comprise 8 gates. In other words, h is equal to 8.

Figure 5:
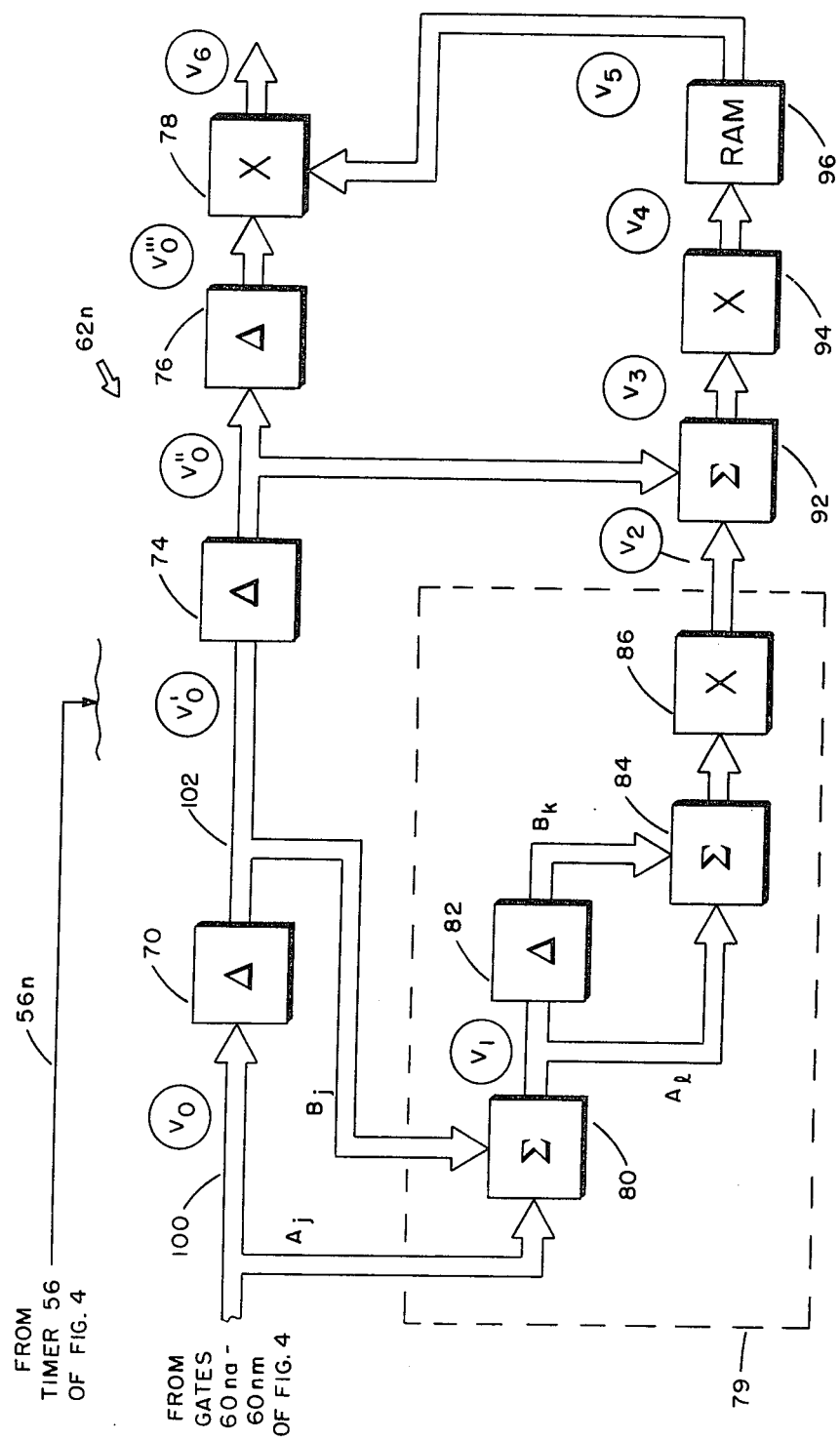
FIG. 5 is a block diagram of the logic for processing the returns from one radar range cell.

Refer now to FIG. 5 which shows a block diagram of a typical logic circuit 62-n of FIG. 4. Digital data, suitably as signal 2's complement, enters logic circuit 62-n from gates 60na-60nh of FIG. 3. It will be remembered that in this embodiment the data enters as 8-bit parallel by bit words, each of which word is a measure of the signal reutrn amplitude in an associated range cell of the radar field of interest. Thus the interconnecting lines between the blocks in this figure, for example lines 100 and 102, represent eight parallel electrical lines, each carrying one bit of the eight bit words. Logic circuit 62-n is strobed by signals received from timer 56 of FIG. 4 via line 56-n. It will be remembered that strobing pulses are generated on line 56-n once every radar return signal and defines the range cell appropriate to and corresponding to the particular logic circuit 62-n being strobed. The digital words are delayed one strobe pulse by delay circuit 70. The input words, which represent a digital voltage $V_o$ and are designated as $A_j$, are combined with the input words as delayed by delay circuit 70, designated as $B_j$, in summer 80 to produce the difference voltage $V_1$ designated as $A_l$:

$$A_l = B_j - A_j.$$

As will be realized, $V_1$ is the digitized voltage corresponding to the value of the first derivative of $V_o$.

$V_1$ is delayed one strobe pulse by delay circuit 82, the delayed signal being designated $B_k$. The output and input of delay circuit 82 are combined in summer 84 to produce the second derivative of $V_o$ at the output of summer 84. The second derivative signal is multiplied in multiplier 86 having a predetermined multiplicand which is the inverse of the square of the sampling period of logic circuit 62-n, that is, a multiplicand which is directly proportional to the square of the strobe pulse repetition frequency on line 56-n. The resulting multiplied signal represents a digital voltage designated as $V_2$. The delayed signal from delay circuit 70, designated as $V_o'$, is further delayed in delay circuit 74, the resulting signal being designated $V_o''$, which signal is summed in summer 92 with the signal $V_2$ from multiplier 86 to produce a signal designated as $V_3$. The output from summer 92 is multiplied by a constant $-K_o$ in multiplier 94 where:

$$K_o = 1, 2, 4, 8, 16 \ldots, \text{etc.}$$

The output from multiplier 94, designated as $V_4$ is functionally:

$$V_4 = -K_o[(\Delta 2 V_o/\Delta n^2) + V_o]$$

that is: $V_4$ is equal to the second derivative of the input signal added algebraically to the original input signal, and the sum multiplied by $-K_o$. The voltage $V_4$ is proportional to the quantity inside the bracket of the exponential function shown in equation (2).

$V_4$ is then raised to an exponential function in random access memory 96, the resultant signal being a digital number representative of a voltage designated $V_5$. This last signal, $V_5$, is multiplied in 78 by a replica of the original input signal $V_o$ as delayed by further strobe pulse in delay circuit 76. The result is designated $V_6$ and is:

$$V_6(nTs) = \text{Exp} - K_o[V_2'(nTs) + V_o''(nTs)]V_o'''(nTs)$$

where:

$V_2'$ is the second derivative;
$V_o''$ is the signal output from delay circuit 74; and
$V_o'''$ is the signal output from delay circuit 76.

Except for differentiator 79, those circuit elements are disclosed later, an embodiment of the invention used the following standard circuit elements for the block elements of FIG. 4:

Summer 92: SN 7483
Delays 70, 74, 76 and 82: SN 74175
Multipliers 86 and 78: MMI 67558
RAM 96: MMI 6336
Multiplier 94: SN 74175

Figure 6:
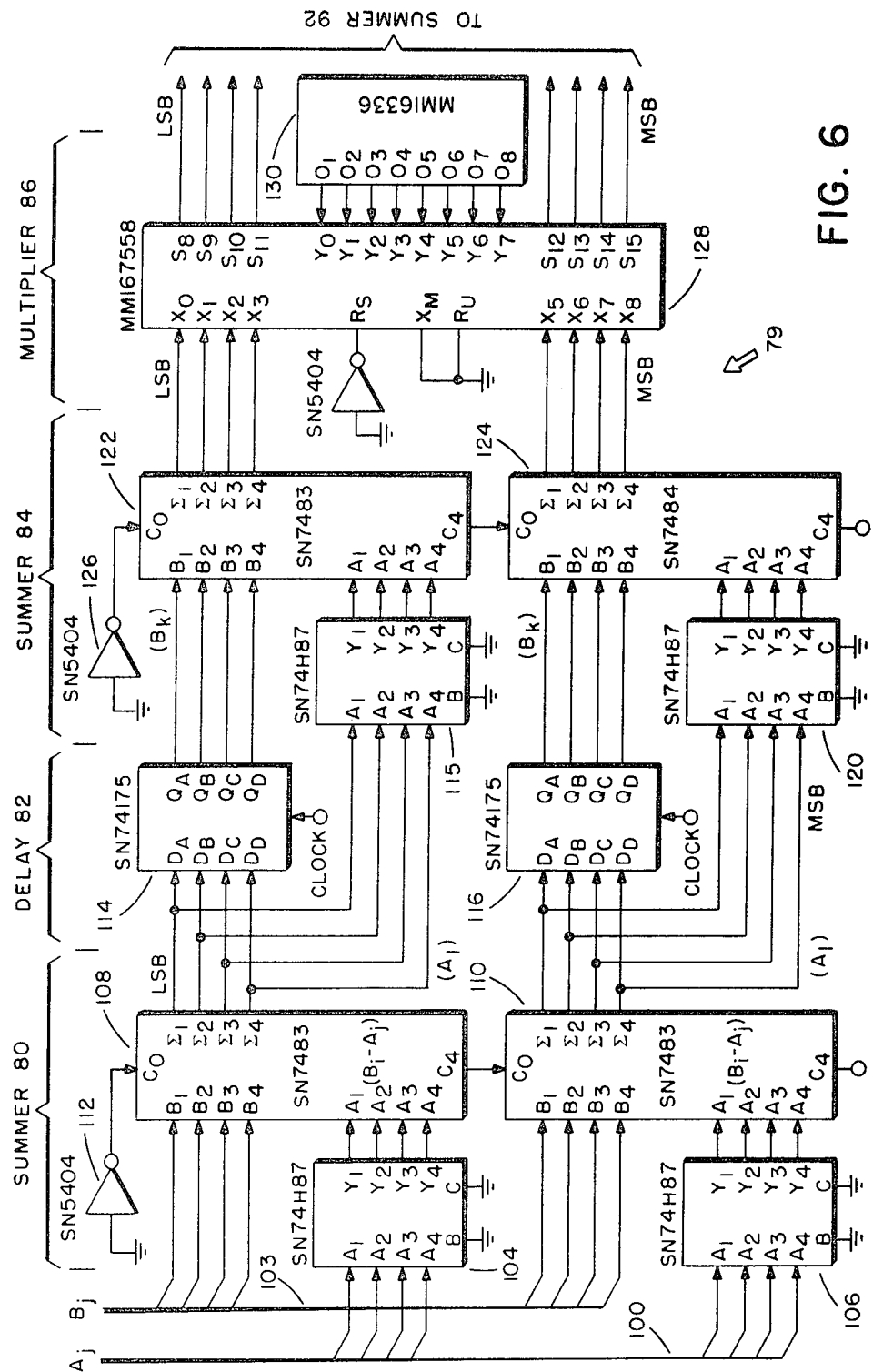
FIG. 6 is a diagram which shows commercially available elements connected in accordance with the logic of FIG. 5.

A detailed block diagram of the differentiator 79 of FIG. 5 is shown at FIG. 6, reference to which latter figure should now be made. Summer 80 is seen to be comprised of two SN 7483 summers 108 and 110 and two SN 74H87 inverters 104 and 106. As shown, the eight lines 100 carrying $A_j$ are applied through SN 74H87 inverters 104 and 106 respectively to summers 108 and 110 respectively. The inverting circuits cause the summing operation performed in the summers to be a minus operation. The eight lines 102 carrying $B_j$ are connected directly to summers 108 and 110 respectively. An SN 5404 inverter 112 connects the carry-in tap of summer 108 to ground. The four most significant bits of the resulting signal are connected through a SN 74175 delay circuit 116 to SN 7484 summer 124 and through SN 74H87 inverter 120 to the same summer. In likemanner, the four least significant bits are applied through SN 74175 delay 114 to SN 7483 summer 122 and through SN 74487 delay 118 to that summer. As before, the inverters permit the summing operation to be a minus operation. Also as before, the carry-in tap of summer 122 is connected to ground through SN 5404 inverter 126. Note that summer 80 is identical to summer 84.

The resultant signal which, as previously explained is proportional to the second derivative of the original input signal $V_o$, is applied to a multiplier 128 whose multiplicand is determined by the signal from MMI 6336 programmable read-only memory 130 which, as also previously explained, has been programmed to cause the multiplicand to be the inverse of the square of logic circuit 62-n sampling or strobe period. The resulting signal is applied to summer 92 of FIG. 5.

It should be understood with respect to FIGS. 4, 5 and 6 that any carry-out of data as a result of the various operations is an indication of overflow condition. It is well within the state of the art for one skilled in the art to provide for carryout if such is desired for an automatic gain control of the receiver, 50, FIG. 4.

Figure 7:
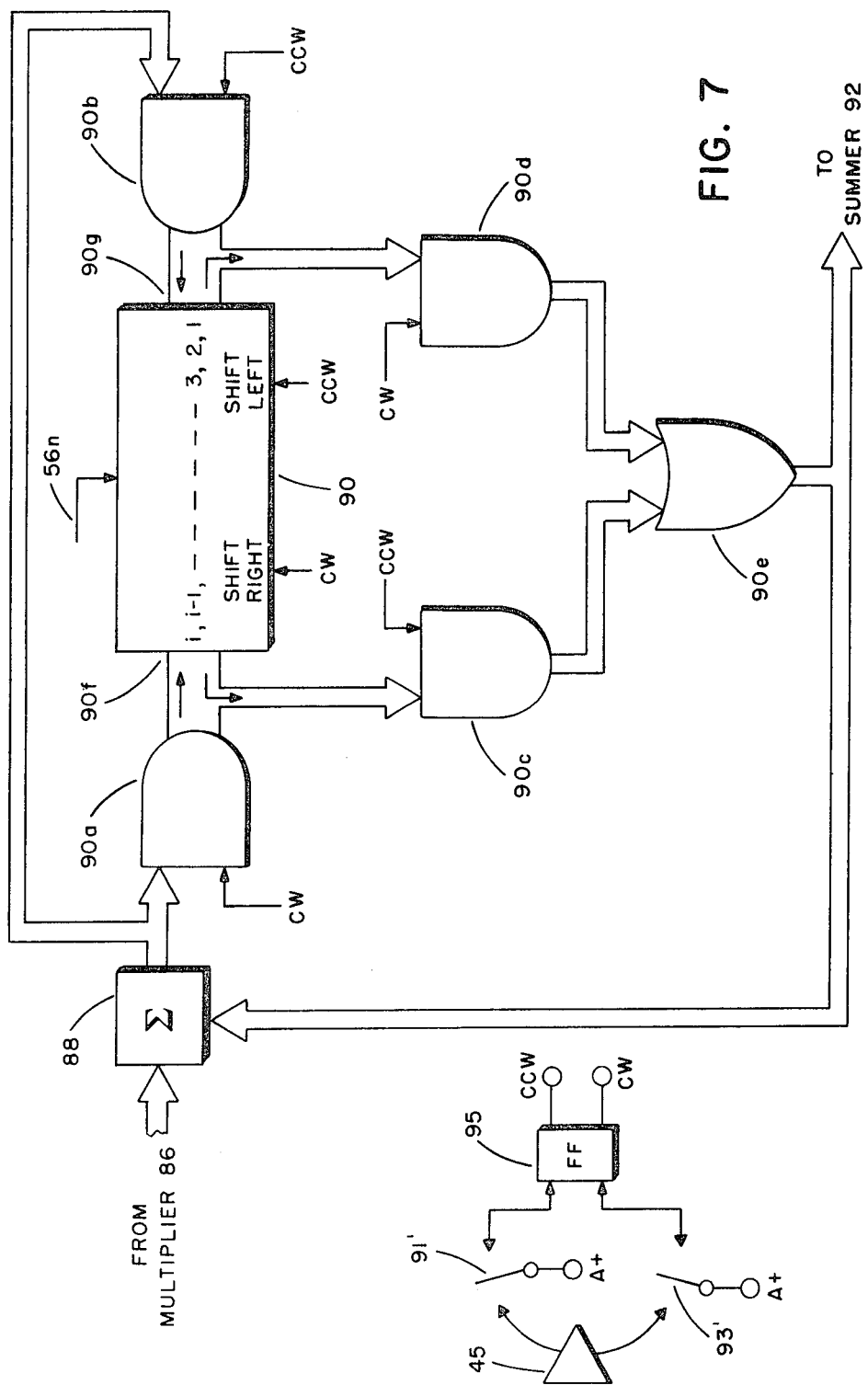
FIG. 7 is a block diagram which shows an integrator suitable for use with the circuit of FIG. 5.
Figure 8:
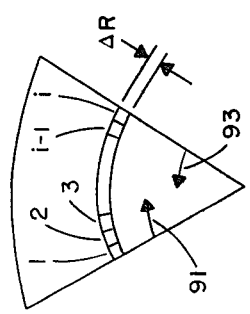
FIG. 8 represents a radar field of view and is helpful in explaining the operation of the integrator of FIG. 7.

The performance of the logic circuits such as that illustrated in FIG. 5 can be improved by integrating the second derivatives so as to mitigate the effect of anomalies in the data. A suitable integrator is shown in FIG. 7, reference to which figure should now be made. The integrator of FIG. 7 is adapted to operate in the circuit of FIG. 5 interposed between multiplier 86 and summer 92. Specifically, the integrator of FIG. 7 is adapted to receive data from multiplier 86 at one input to summer 88 and to deliver data to summer 92 from OR gate 90e. The integrator of FIG. 7 is comprised of a universal shift register means 90, that is, a shift register means which can shift data applied thereto and therein either to the right or to the left depending on whether a Shift Right or Shift Left terminal is excited and which can interchange its input and output taps. The universal shift register acts as an accumulator and is required for the present embodiment wherein the invention is used in a radar system having an antenna beam which scans to and fro through a field of interest. Referring to FIG. 8 a radar field of interest is seen where the antenna beams sweeps to and fro first in the direction of arrow 91 and then back in the direction of arrow 93. Seen superimposed on the field for illustrative purposes are the constant range cells 1, 2, 3 . . . i−1, i which comprise a typical constant range band of range cells. It can be seen that as the antenna beam sweeps in the direction of arrow 91 it sweeps through, in succession, range cells 1, 2, 3 . . . i−1, i and that as the antenna beam sweeps in the direction of arrow 93 it sweeps through, in succession, range cells i, i−1 . . . 3, 2, 1. In integrating range cell data returns, the signals related to a particular range cell are averaged over a plurality of scans. This implies the use of a suitable storage means such as shift register 90 wherein past data can be stored for retrieval and summing with current data. Returning now to FIG. 7, universal shift register means 90 provides such a storage means as follows. Data from multiplier 86 is summed with data retrieved from shift register means 90 through either AND gate 90c or 90d and OR gate 90e. The result is averaged and applied as inputs to AND gates 90a and 90b. The radar antenna 45 is provided with momentary contact limit switches 91' and 93'. When antenna 45 actuates limit switch 91' at the completion of its clockwise excursion, switch 91' closes momentarily and causes flip-flop 95 to generate a CCW signal. When antenna 45 actuates limit switch 93' at the completion of its counterclockwise excursion, switch 93' closes momentarily and causes flip-flop 95 to generate a CW signal. The CW signal qualifies AND gates 90a and 90d and is applied to shift register 90 to cause the data therein to be shifted to the right in response to pulses on line 56n. The CCW signal qualifies AND gates 90b and 90c and is applied to shift register 80 to cause the data therein to be shifted to the left in response to pulses on line 56n. Thus, the antenna is scanning clockwise, that is in the direction of arrow 91 of FIG. 8, gates 90b and 90c are closed and gates 90a and 90d are open so that data from summer 88 enters shift register 90 through gate 90a and into shift register 90 via terminal 90f in response to pulses on line 56n. At the same time, previously stored data is clocked out via terminal 90g and gates 90d and 90e. As will become clear, data in shift register means 90 at the completion of an antenna scan is always in the positions shown, that is, with data related to range cell 1 at the extreme right hand position of the shift register means and data related to range cell i at the extreme left hand position of 20 the shift register means. Thus, the data retrieved from shift register means 90 is applied in proper order to summer 88, that is, data related from identical range cells is applied simultaneously to the two inputs of summer 88.

When flip-flop 95 generates the CCW signal, signifying that the antenna is moving in the direction of arrow 93 of FIG. 8, gates 90a and 90d are closed and gates 90b and 90c are qualified. In addition, the CCW signal applied to shift register means 90 causes the data therein to be shifted to the left in response to pulses from line 56n. Thus, data enters shift register means 90 through terminal 90g thereof from gate 90b and previously stored data is strobed from shift register means 90 via terminal 90f through gate 90c to summer 88.

It should be obvious to one skilled in the art that shift register means is an eight level shift register, that each of the various gates illustrated is actually 8 parallel gates and that the interconnecting lines are 8 parallel lines in the present embodiment. The shift registers of shift register means 90 are each i units long where i is equal to the number of constant range cells in the radar field of interest.

Figure 9:
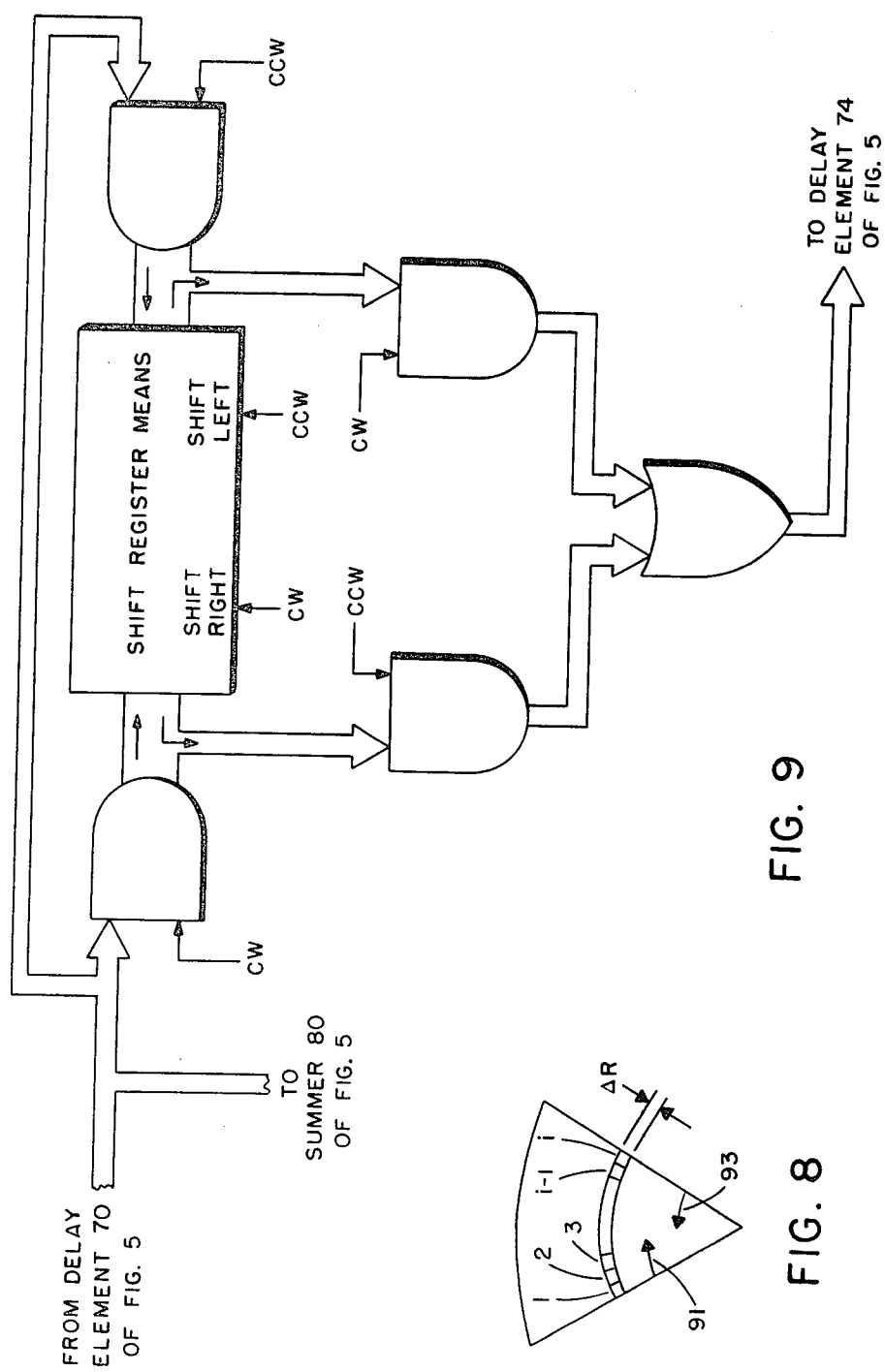
FIG. 9 is a block diagram of a delay element used in the circuit of FIG. 5 when the integrator of FIG. 7 is also used.

Since shift register means 90 of FIG. 7 will delay the communication of the second derivatives to summer 94 of FIG. 5 it is necessary to provide an identical delay between delay elements 70 and 74. This is done by interposing a circuit identical to that of FIG. 7 between elements 70 and 74 of FIG. 5, except that summer 88 of FIG. 7 is eliminated. This delay circuit is shown at FIG. 9, the operation of which should be clear with the note that the CW and CCW signals are the same CW and CCW signals of FIG. 7.

Figure 10:
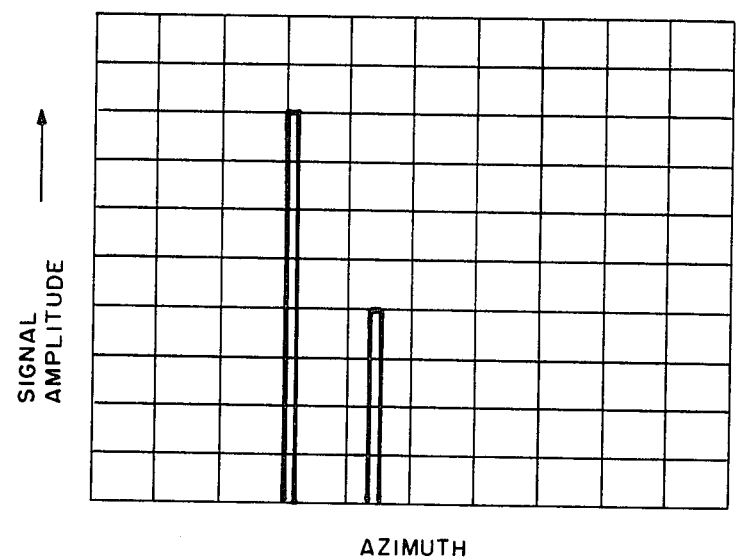
FIGS. 10 through 16 are plots of voltage in a given range cell at various points in the circuit of the invention for various closely angularly spaced radar targets and are used to demonstrate the improvement in angular resolution provided by the invention.
Figure 12:
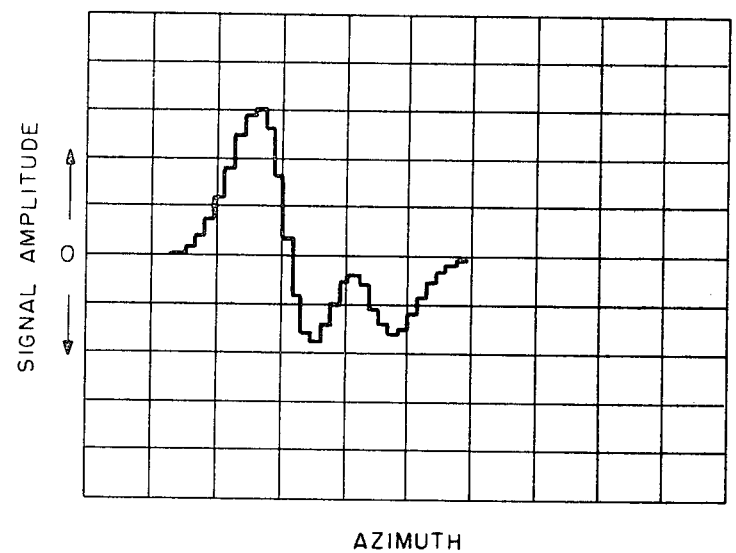
Figure 13:
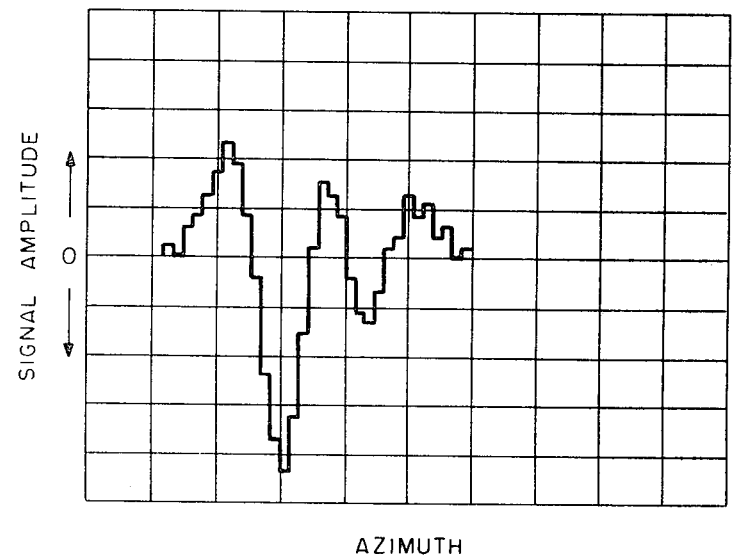
Figure 14:
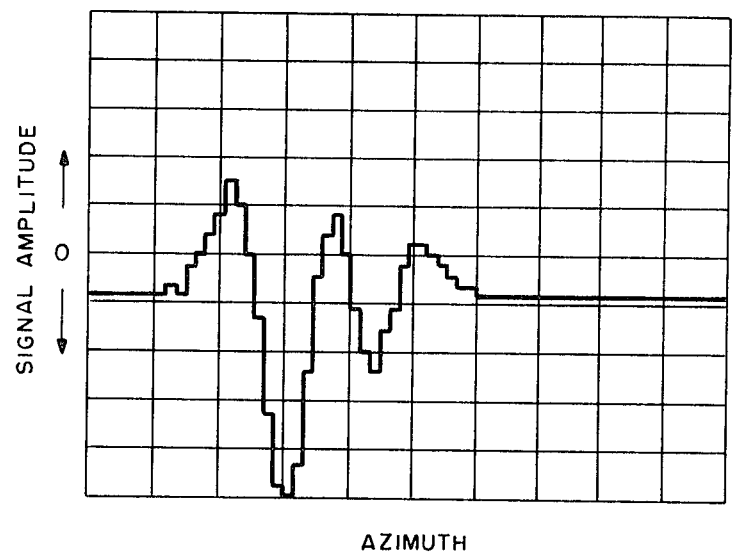
Figure 15:
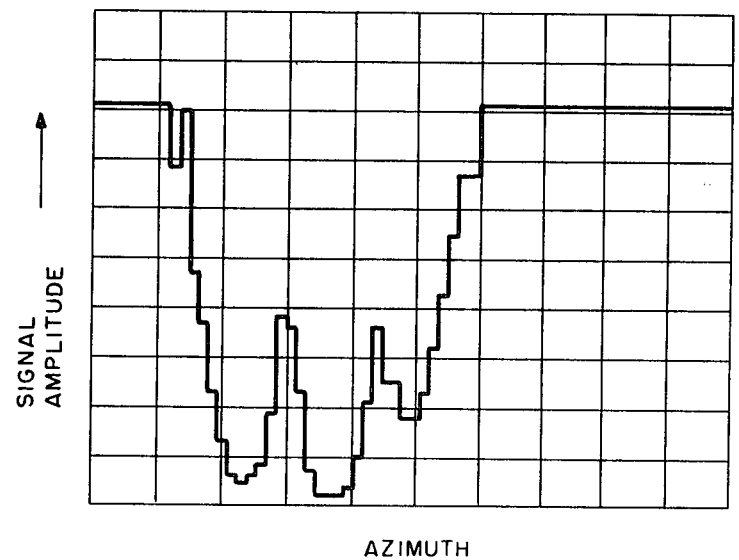
Figure 16:
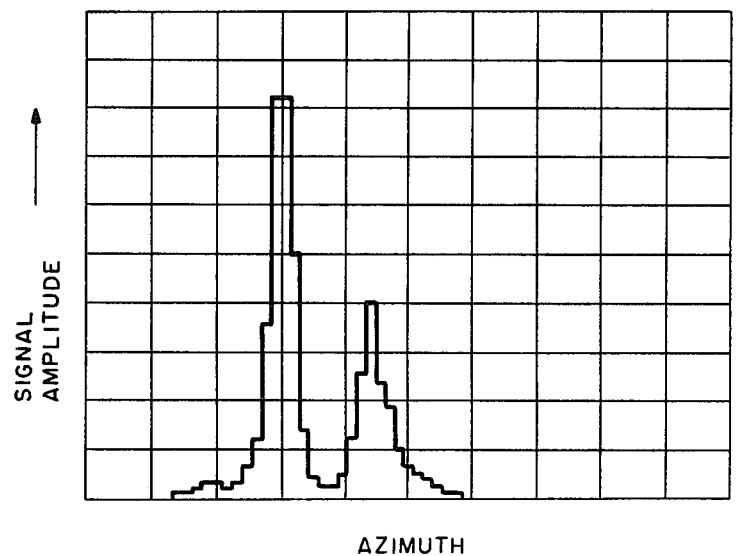

Refer now to FIGS. 10 through 16 where FIG. 10 is an idealized plot of the radar signal returns from two point targets having unequal returns, that is, where the radar antenna beamwidth approaches zero degrees. At FIG. 11 the digitized radar signal return from the same two targets is again seen. In this case, the antenna −3db beamwidth is assumed to be greater than the target angular separation. As can be seen, the two targets cannot be resolved. FIG. 11, in essence, is a plot of $V_o$ in FIG. 5. FIG. 12 is a plot of the first derivative of the signal plotted in FIG. 11 and corresponds to $V_1$ of FIG. 5. The second derivative is plotted in FIG. 13 and corresponds to $V_2$ of FIG. 5. The integrated second derivative is plotted in FIG. 14. The output signal from summer 96, $V_5$, is shown plotted in FIG. 15. The logic circuit output voltage $V_6$ is plotted in FIG. 16. As can be seen, the two targets are now fully resolved.

Returning now to FIG. 4, the signal outputs from the various logic circuits 62 are reassembled into azimuth or elevation lines of data, as appropriate, by means of AND gates 64 and OR gates 66. Specifically, gates 64 are qualified in turn by the signals on lines 56. The signals then present at the input to AND gates 64 is thus passed therethrough and through OR gate 66a–66h into shift registers 68a–68h in response to the clock pulses on line 56a. Remembering that in this embodiment each digital word defining the signal return amplitude in a range cell is an eight bit word and also remembering that there are 128 range cells in each signal return, it should be clear that there are eight OR gates 66 and eight shift registers 68. It should also be clear that shift registers 68 are each 128 bits long. There will thus be loaded into shift registers 68 one complete azimuth or elevation line of data for each pulse transmitted by antenna 45, and more particularly, after the 128 clock pulses on line 56a. Shift registers 68 comprise a buffer 68 from which the lines of data can subsequently be extracted, preferably during the radar transmitter interpulse period. In this manner the buffer will be empty and ready to receive the next line of data.

As known to those skilled in the art, in analogous type systems the data in buffer 68 is addressed by reference to the antenna beam pointing angle, a separate means (not shown) such as a register being provided to temporarily store a signal relating to the pointing angle. Such means do not comprise the present invention and being well known to those skilled in the art are not described here but are mentioned merely as background.

Having described this embodiment of our invention various alterations and modifications thereof should now be obvious to one skilled in the art. For example, one should not be able to embody our invention using alternate forms of circuits such as random access or charge coupled memories rather than the shift register memories shown. One is also able, using our teaching, to process signals of greater or fewer signal levels than those expressly taught in our preferred embodiment. Accordingly, our property is not to be limited to the exact form of our preferred embodiment but rather is to be limited only by the true spirit and scope of the appended claims.

What is claimed is:

1. Means for improving the angular target resolution of an incoherent pulse radar system wherein the antenna beam is scanned back and forth through a field of interest and wherein the radar return signals are converted into elements of digital data, and where-in said field of view is divided into lines of increasing range cells and lines of constant range cells, comprising:
    means for generating first signals relating to the second derivatives of the elements of digital data corresponding to radar return signals from at least one line of constant range cells, each said first signal being associated with a particular range cell;
    means for summing a plurality of said first signals associated with each particular range cell; and,
    means for combining each sum of said first signals with an element of digital data corresponding to the same range cell to provide a new element of digital data, a plurality of said new elements corresponding to range cells in a line of constant range cells thereby exhibiting improved angular target resolution.

2. The means for improving the angular target resolution of an incoherent pulse radar system of claim 1 wherein said means for generating first signals comprises:
    means for delaying each said element of digital data by a fixed time period;
    means for combining each delayed element of digital data with a subsequent element of digital data to provide a difference signal;
    means for delaying said difference signal by a second fixed time period; and,
    means for combining the delayed difference signal with a subsequent difference signal to provide said first signals.

3. Means for improving the angular target resolution of a system wherein a sensing means scans repeatedly across a field of interest divided into cells arranged in lines of constant range, and wherein said sensing means produces elements of digital data, each said element representing the target return from an associated cell in one said line, a plurality of logic circuits, each said logic circuit comprising:
    means for generating, in sequence, first signals relating to the second derivatives of the elements of digital data representing the target returns from cells in one said line;
    means for summing, scan to scan, a plurality of said first signals associated with each cell in said line; and,
    means for combining each sum of said first signals with an element of digital data corresponding to the same range cell to provide a new element of digital data, a plurality of said new elements corresponding to range cells in said line, thereby exhibiting improved angular target resolution.

4. The means for improving angular target resolution of claim 3 wherein said cells are also arranged in lines of increasing range and wherein said system includes means for generating an initial signal and means responsive to said initial signal for generating strobe pulses defining cells in lines of constant range and clock pulses defining cells in lines of increasing range, with additionally:
    a buffer responsive to said clock pulses for receiving said new elements of digital data as lines of increasing range; and,
    gate means responsive to said strobe pulses for communicating said new elements of digital data to said buffer.

5. Means for improving the angular target resulution of an incoherent pulse radar system wherein the antenna beam is scanned back and forth through a field of interest and wherein the radar return signals are converted into elements of digital data, and wherein said field of view is divided into lines of increasing range cells and lines of constant range cells, comprising:
    means for generating first signals relating to the second derivatives of the elements of digital data corresponding to radar return signals from at least one line of constant range cells, each said first signal being associated with a particular range cell; and
    means for combining each of said first signals with an element of digital data corresponding to the same range cell to provide a new element of digital data, a plurality of said new elements corresponding to range cells in said line of range cells thereby exhibiting improved angular target resolution.

6. The means for improving the angular target resolution of an incoherent pulse radar system of claim 5 wherein said means for generating first signals comprises:
    means for delaying each said element of digital data by a fixed time period;
    means for combining each delayed element of digital data with a subsequent element of digital data to provide a difference signal;
    means for delaying said difference signal by a second fixed time period; and,
    means for combining the delayed difference signal with a subsequent difference signal to provide said first signals.

7. Means for improving the angular target resolution of a system wherein a sensing means scans repeatedly across a field of interest divided into cells arranged in lines of constant range, and wherein said sensing means produces elements of digital data, each said element representing the target return from an associated cell in one said line, a plurality of logic circuits, each said logic circuit comprising:
    means for generating, in sequence, first signals relating to the second derivatives of the elements of digital data representing the target returns from cells in one said line; and, means for combining each said first signal with an element of digital data corresponding to the same range cell to provide a new element of digital data, a plurality of said new elements corresponding to range cells in said line, thereby exhibiting improved angular target resolution.

8. The means for improving angular target resolution of claim 7 wherein said cells are also arranged in lines of increasing range and wherein said system includes means for generating an initial signal and means responsive to said initial signal for generating strobe pulses defining cells in lines of constant range and clock pulses defining cells in lines of increasing range, with additionally:

a buffer responsive to said clock pulses for receiving said new elements of digital data as lines of increasing range; and, gate means responsive to said strobe pulses for communicating said new elements of digital data to said buffer.

* * * * *

UNITED STATES PATENT OFFICE
CERTIFICATE OF CORRECTION

Patent No. 4,243,988             Dated January 6, 1981

Inventor(s) Eyung W. Kang et al.

It is certified that error appears in the above-identified patent and that said Letters Patent are hereby corrected as shown below:

In column 8, line 12, cancel $$"V_6(nTs) = \text{Exp} -K_o[V_2'(nTs) + V_o''(nTs)] V_o'''(nTs)"$$

and substitute $$--V_6(nTs) = \text{Exp}\left\{-K_o[V_2'(nTx) + V_o''(nTs)]\right\} V_o'''(nTs)--.$$

Signed and Sealed this

Sixteenth Day of June 1981

[SEAL]

Attest:

RENE D. TEGTMEYER

Attesting Officer      Acting Commissioner of Patents and Trademarks